United States Patent [19]

Fair

[11] Patent Number: 4,506,758

[45] Date of Patent: Mar. 26, 1985

[54] HIGH FREQUENCY REACTION MASS AND HYDRAULIC CYLINDER ASSEMBLY

[76] Inventor: Delbert W. Fair, 2221 E. Hartford, Ponca City, Okla. 74601

[21] Appl. No.: 640,216

[22] PCT Filed: Aug. 8, 1979

[86] PCT No.: PCT/US79/00591

§ 371 Date: Apr. 8, 1981

§ 102(e) Date: Feb. 23, 1981

[87] PCT Pub. No.: WO81/00460

PCT Pub. Date: Feb. 19, 1981

Related U.S. Application Data

[63] Continuation of Ser. No. 270,535, Apr. 8, 1981, abandoned.

[51] Int. Cl.³ .................. G01V 1/135; G01V 1/04; F01B 15/00
[52] U.S. Cl. ...................... 181/119; 181/121; 367/189; 73/665
[58] Field of Search ............ 181/106, 119, 121; 367/189; 73/665, 662; 404/117

[56] References Cited

U.S. PATENT DOCUMENTS

| 3,143,181 | 8/1964 | Boys et al. | 181/119 |
| 3,745,885 | 7/1973 | Fair et al. | 181/119 |
| 4,106,586 | 8/1978 | Stafford | 181/121 |
| 4,253,538 | 3/1981 | Weber et al. | 181/121 |

FOREIGN PATENT DOCUMENTS 612196  6/1978  U.S.S.R. .................. 181/121

Primary Examiner—Nelson Moskowitz
Attorney, Agent, or Firm—William J. Miller

[57] ABSTRACT

A reaction mass and hydraulic cylinder assembly for a seismic transducer. A hydraulic biasing cylinder (76) is formed between a lower piston rod (32) and a reaction mass (44) and is located below a hydraulic drive cylinder (46). The lower piston rod (32) includes a first portion (36) and a detachable second portion (38-40), the detachable second portion forming an upward facing shoulder (42) which partially defines the hydraulic biasing cylinder (76). The hydraulic drive cylinder (46) is formed by a cylinder sleeve (48) and upper and lower cylinder bushings (50 and 52) having lower and upper ends (54 and 56), respectively, concentrically received within the cylinder sleeve (48) to define the upper and lower ends, respectively, of the hydraulic drive cylinder.

6 Claims, 2 Drawing Figures

HIGH FREQUENCY REACTION MASS AND HYDRAULIC CYLINDER ASSEMBLY

This application is a continuation of application Ser. No. 270,535, filed Apr. 8, 1981, now abandoned.

BACKGROUND OF THE INVENTION

1. Field of the Invention

The present invention relates generally to transducers for inducing vibrational signals in an elastic medium, and more particularly, but not by way of limitation, it relates to an improved construction for a relatively high frequency transducer for generating seismic waves in the earth.

2. Description of the Prior Art

The prior art includes hydraulic vibrators having drive cylinders and biasing cylinders as is illustrated by U.S. Pat. No. 3,745,885 issued to Fair et al. on July 17, 1973. The Fair et al. apparatus is constructed for operation in normal frequency ranges of approximately 2–80 cycles per second. Yet another patent of particular interest is U.S. Pat. No. 4,106,586 in the name of Stafford. This teaching provides a vibrator assembly wherein the cylinder end sleeves are adjustable between two extreme positions to either shorten or lengthen the hydraulic cylinder. The present invention provides a form of apparatus generally similar to that of Fair et al. but suitable for a much higher operating frequency range up to and exceeding 250 cycles per second.

SUMMARY OF THE INVENTION

This invention provides a hydraulic transducer cylinder and mass assembly for a seismic source that is capable of generating high force output over a wide frequency of seismic signals, the hydraulic fluid compressibility in the hydraulic system which drives the transducer is a limiting factor. Therefore, to maintain a high natural frequency of the fluid compressibility and the effective mass, the ratio of hydraulic cylinder area to trapped fluid volume must be optimized to as high a value as possible within the scope of practical design and operating conditions.

The present invention meets these requirements by using a relatively large area short stroke cylinder, and by using relatively short passages between the drive cylinder and the servo-valve. To obtain these relatively short passages, the drive cylinder is located close to the servo-valve, and the hydraulic biasing cylinder is located below the drive cylinder, i.e., rather than above the drive cylinder as was shown in U.S. Pat. No. 3,745,885, and the high pressure fluid is ported from the servo-valve through the piston rod to the drive cylinders. In addition, the servo-valve is mounted with the main valve spool perpendicular to the piston rod axis for valve stability; and the valve is mounted at or near the center of the piston rod end to decrease passage length and to more nearly equalize the passage length to each side of the cylinder.

Finally, the cylinder assembly of the present invention provides a drive cylinder the length of which may be varied so as to allow the transducer to operate over different frequency ranges by changing the allowable stroke of the drive piston within the drive cylinder.

DETAILED DESCRIPTION OF THE PREFERRED EMBODIMENTS

Figure 1:
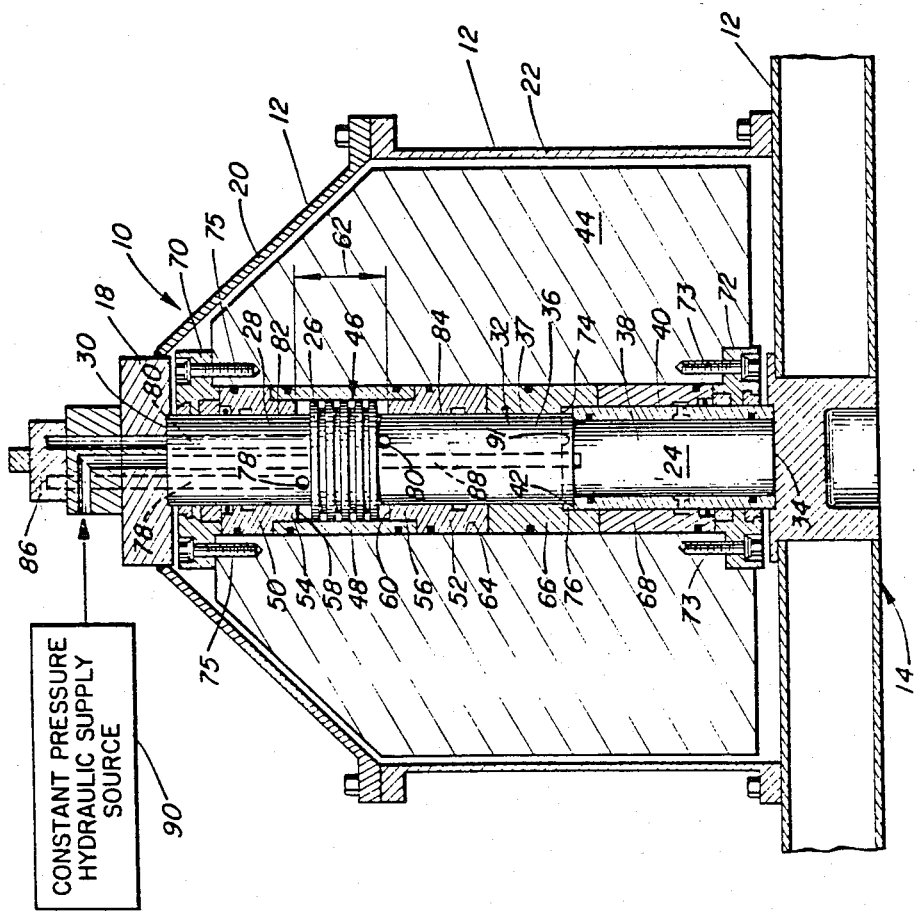
FIG. 1 is a partly sectional side elevation of the seismic transducer of the present invention, showing some of the components in schematic form.

Referring now to the drawings and particularly to FIG. 1, the hydraulic vibrator apparatus or seismic transducer of the present invention is shown and generally designated by the numeral 10.

The hydraulic vibrator 10 includes a frame assembly generally designated by the numeral 12. The frame assembly 12 includes a plate section 18, a frusto-conical section 20, and a cylindrical section 22. Frame assembly 12 as made up by its component sections constitutes a rigid housing that provides a secure interconnection between the upper piston rod end 30, to be described, and the baseplate 14 which, in turn, is rigidly affixed to the lower piston rod end 34.

Thus, a vertical double rod-end piston member 24 includes a drive piston 26, an upper rod 28 extending from drive piston 26, an upper end 30 attached to plate section 18, and a lower rod 32 extending from piston 26 and having a lower end 34 attached to baseplate assembly 14.

Lower rod 32 includes a first portion 36 having a first cylindrical section 37 extending from drive piston 26, and a second reduced diameter cylindrical section 38 extending from first section 37. The lower end 34 of lower rod 32 is the lower end of the second reduced diameter section 38 of lower rod 32. A second portion of lower rod 32, comprising a cylindrical piston rod sleeve 40, is disposed about reduced diameter section 38 of lower rod 32 to form an annular upward facing shoulder 42.

A reaction mass 44 is disposed for reciprocal actuation about said piston member 24 and includes an axial bore with a cylinder sleeve 48 to form a hydraulic drive cylinder 46 around drive piston 26. The construction of the frame 12, as described above, allows mass 44 to be completely enclosed. Preferably, the reaction mass 44 is constructed so that it has a center of gravity located a distance above the ground surface no greater than one-half the minimum horizontal dimension of baseplate 14.

A hydraulic drive cylinder 46 is formed by the cylinder sleeve 48, within which drive piston 26 is reciprocally disposed and is defined by upper and lower cylinder bushings 50 and 52, respectively. That is, the upper and lower cylinder bushings 50 and 52 have lower and upper reduced diameter end portions 54 and 56, respectively, which are concentrically received within the upper and lower ends of cylinder sleeve 48 to define the upper and lower ends 58 and 60, respectively, of the hydraulic drive cylinder 46.

The length 62 of drive cylinder 46 may be varied by replacing the cylinder bushings 50 and 52 with similar cylinder bushings having selected different lengths of reduced portions 54 and 56, respectively, which extend into the cylinder sleeve 48. This can allow seismic transducer 10 to operate over different frequency ranges by changing the allowable stroke of the drive piston within the drive cylinder. If the length of the reduced portions 54 and 56 are extended, the total volume of the fluid within the cylinder will be reduced thereby extending the upper frequency limits of the vibrator; however, in so doing the allowable stroke of the vibrator must be reduced to prevent the piston from striking the portions 54 and 56. The reduced stroke is accomplished by limiting the lowest frequency transmitted by the vibrator.

Upper cylinder bushing 50, cylinder sleeve 48, and lower cylinder bushing 52 are closely received within an axial bore 64 of reaction mass 44. Also received within axial bore 64 is descending order below cylinder bushing 52 are a biasing cylinder bushing 66 and a bottom bushing 68. The various sleeves and bushings just described are held in place by upper and lower end caps 70 and 72 which are attached by means of bolts 73 and 75 to reaction mass 44.

The biasing cylinder bushing 66 of reaction mass member 44 includes a downward facing shoulder 74 located below drive cylinder 46 and above upward facing shoulder 42 of lower rod 32 to form a hydraulic biasing cylinder 76 between said upward facing shoulder 42 and said downward facing shoulder 74.

First and second fluid port passages 78 and 80 are disposed axially through piston member 24 and communicate with outer surfaces 82 and 84 of upper and lower piston rods 28 and 32, respectively, i.e., to the upper and lower portions of cylinder 46.

The upper end passages of first and second ports 78 and 80 communicate with a conventional servo-valve 86 which alternatingly supplies hydraulic fluid under pressure through ports 78 and 80 to cause reaction mass member 44 to be reciprocated relative to drive piston 26. A servo-valve 86 may be generally referred to as a source of hydraulic fluid under pressure.

By placing biasing cylinder 76 below drive cylinder 46, the length of passages to ports 78 and 80 between drive cylinder 46 and servo-valve 86 is maintained as short as possible. To obtain satisfactory operation of seismic transducer 10 in the higher seismic frequency bands it is necessary to design the system so that its natural frequency is above the desired operating frequency. The natural frequency referred to is that of the spring-mass system represented by the mass of frame assembly 12 and the spring constant of the fluid trapped in drive cylinder 46 and the passages of 78 and 80.

This natural frequency of the system is proportional to the square root of the spring constant of the fluid trapped within drive cylinder 46 and ports 78 and 80. The spring constant is in turn proportional to the ratio of the square of the annular area swept by piston 26 divided by the volume of fluid trapped within drive cylinder 46 and the port passages 78 and 80. By having a large bore, short stroke piston, and by minimizing the lengths of port passages 78 and 80, the above ratio and the natural frequency of the system are maximized to the greatest extent practical.

The formula for calculating the natural frequency (f) of the system is:

$$f = \frac{1}{2}\pi\sqrt{\frac{K(386)}{W}}$$

where,
  W = weight of frame 12, in pounds, and
  K = the spring constant of trapped fluid as calculated by the expression in pounds per inch $$K = \frac{2\beta A^2}{V},$$

where,
  $\beta$ = bulk modulus of fluid (e.g., $2.5 \times 10^5$ psi for hydraulic oil)
  A = annular area swept by piston 26 in square inches, and
  V = trapped fluid volume in cubic inches from servo-valve 86 to surface of piston 26 with the piston 26 in its mid-position in drive cylinder 46.

A biasing port 88 and passageway is also disposed in piston member 24 and provides a means for introducing a substantially constant hydraulic pressure to hydraulic biasing cylinder 76. The biasing port 88 passageway is connected between substantially constant pressure hydraulic supply source 90 and the hydraulic biasing cylinder 76. A radial bore portion 91 of biasing port 88 communicates with outer surface 84 of the first cylindrical section 37 of lower rod 32 adjacent hydraulic biasing cylinder 76. The substantially constant pressure hydraulic fluid supply from source 90 has a sufficient pressure so that the weight of the reaction mass 44 is offset or equalized by the upward hydraulic force acting on downward facing shoulder 74 of biasing cylinder bushing 66 in reaction mass member 44. This piston member 24 also includes porting (not speficially shown) for fluid pressure bleed-back and maintenance of the mass bore sealing system, such bleed-back porting now being known in the related art and subject of a copending application.

Figure 2:
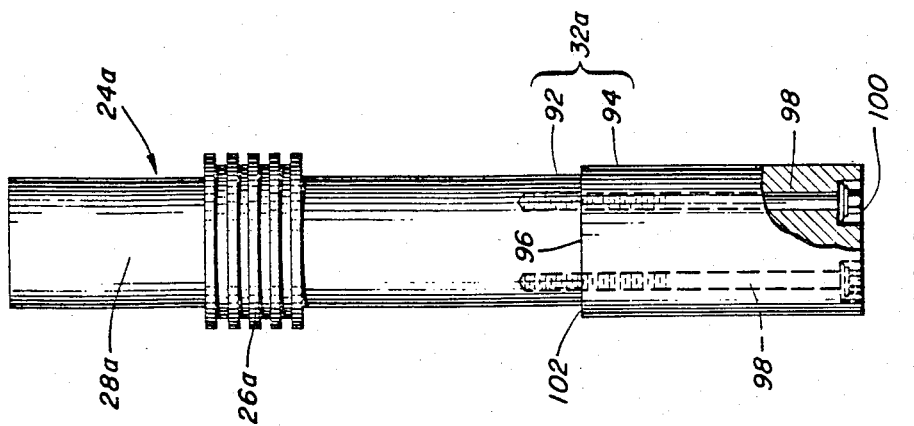
FIG. 2 is an elevational view of an alternative embodiment of the piston rod assembly of the present invention.

An alternative version of the piston member 24 is shown in FIG. 2 and is generally designated by the numeral 24a. The double rod-end piston member 24a includes a drive piston 26a, an upper rod 28a and a lower rod 32a.

The lower rod 32a includes a first cylindrical portion 92 extending from drive piston 26a. A detachable second cylindrical portion 94 of lower rod 32a has its upper end 96 attached to first portion 92 by a plurality of longitudinally extending bolts 98 and the lower end 100 is adapted for attachment to frame 12. Detachable second cylindrical portion 94 has an outer diameter greater than the outer diameter greater than the outer diameter of first portion 92 so as to form an annular upward facing shoulder 102 similar to the upward facing shoulder 42 of FIG. 1. The double rod-end piston member 24a of FIG. 2 would include porting (not shown) similar to the ports 78, 80, and 88 of FIG. 1.

In operation, the seismic vibrator 10 is placed at a selected earth site with baseplate 14 held down on the earth surface under sufficient weight to insure energy coupling. The associated electronic control signal generator and hydraulic drive source (not shown) are then energized to produce vibrator actuation. In this case, the control signal will be at higher frequencies, on the order of 250 Hertz at upper sweep frequencies. Thus, servo-valve 86 controls alternating fluid pressure as between port passages 78 and 80 to cause reciprocation of reaction mass 44 relative to piston 26 and consequent vertical reciprocation of baseplate 14. The gravitational drag caused by weight of reaction mass 44 is negated by application of selected fluid pressure from source 90 via port passage 88 to biasing cylinder 76.

The high frequency vibrations are optimally achieved by (1) positioning the cylinder 46 and piston 26 as close as practical to the servo-valve 86, thus reducing the volume of fluid and the attendant compressibility factor associated with the porting passages, and (2) reducing the stroke of piston 26 as well as the volume of cylinder 46 to a degree that is practicable in view of the mass vibrations per the desired high frequency range. These measures enable the capability of achieving effective energy input to the earth of vibratory energy on the order of 250 Hertz and higher.

Thus it is seen that the present invention achieves the objects and advantages mentioned as well as those inherent therein. While certain preferred embodiments of the invention have been illustrated for the purpose of this disclosure, numerous changes and modifications of those embodiments may be made by those skilled in the art, which changes and modifications are included within the scope and spirit of this invention as defined by the following claims.

The embodiments of this invention in which an exclusive property or privilege is claimed are defined as follows:

1. A seismic transducer apparatus for operation over an operating frequency range extending into the higher seismic frequency range above 80 cycles per second, comprising: a frame; a vertical double rod-end piston member, including a drive piston with upper and lower rods extending from said drive piston and having axial ends attached to said frame, said lower rod being about twice the length of the upper rod; a reaction mass member reciprocally disposed about said piston member and forming a hydraulic drive cylinder around said drive piston; and a hydraulic biasing cylinder formed between an upward facing shoulder of said lower rod and a downward facing shoulder of said reaction mass member; first port means directed for communication adjacent the lower rod with the biasing cylinder; second and third port means directed axially through the short upper rod for communication above and below the drive piston, respectively, with the drive cylinder; hydraulic valve control means mounted proximate the axial end of the upper rod in control communication with said second and third port means; whereby said biasing cylinder is located below said drive cylinder to minimize the length of fluid port means supplying fluid to said drive cylinder through increasing the natural frequency of the spring-mass system represented by the mass of said frame and the spring constant of the trapped fluid in said drive cylinder and said second and third port means to a value above said operating frequency range.

2. Apparatus of claim 1, wherein said lower rod includes a first portion extending from said drive piston and a detachable second portion connected to said first portion, said detachable second portion forming said upward facing shoulder of said lower rod.

3. The apparatus of claim 2, wherein said detachable second portion of said lower rod comprises a cylindrical sleeve disposed on said first portion.

4. The apparatus of claim 3, wherein said first portion of said lower rod includes a first cylindrical section extending from said drive piston and a reduced diameter second cylindrical section extending from said first section and having an end attached to said frame, said cylindrical sleeve being disposed about said reduced diameter second section and having an outer diameter greater than an outer diameter of said first cylindrical section.

5. The apparatus of claim 2, wherein: said first portion of said lower rod is further characterized as being a cylindrical first portion; and said detachable second portion of said lower rod comprises a cylindrical second portion having an upper end attached to said first portion and a lower end attached to said frame, said detachable cylindrical second portion having an outer diameter greater than an outer diameter of said first portion.

6. The apparatus of claim 5, wherein said first and second portions of said lower rod are bolted together.

* * * * *